Jan. 16, 1945.                    W. C. RANDALL                    2,367,610
           PANEL FOR USE IN WALLS, PARTITIONS, AND THE LIKE
                    Filed Dec. 19, 1941          3 Sheets-Sheet 1
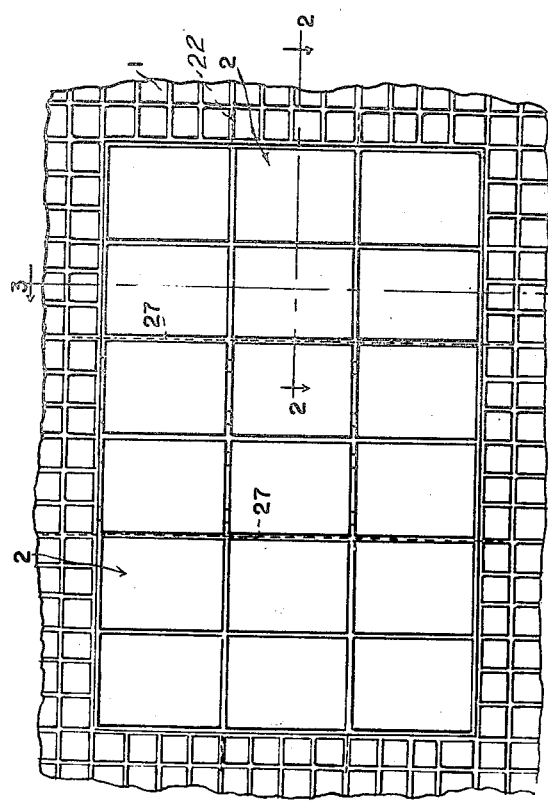
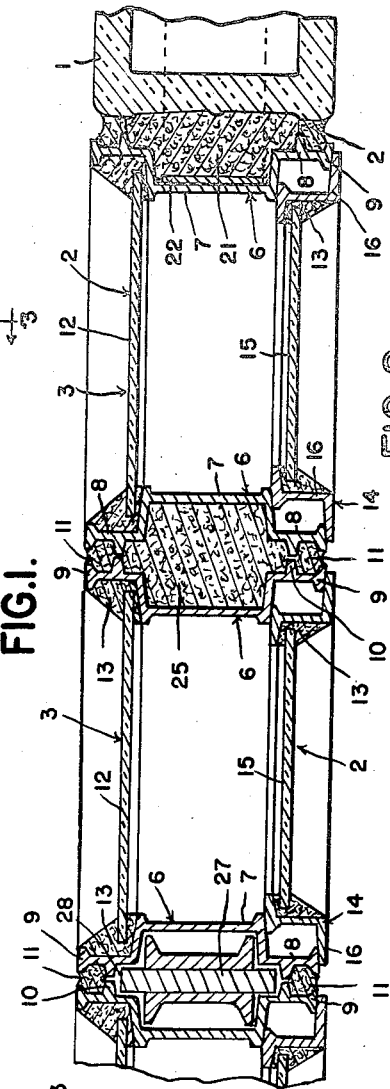
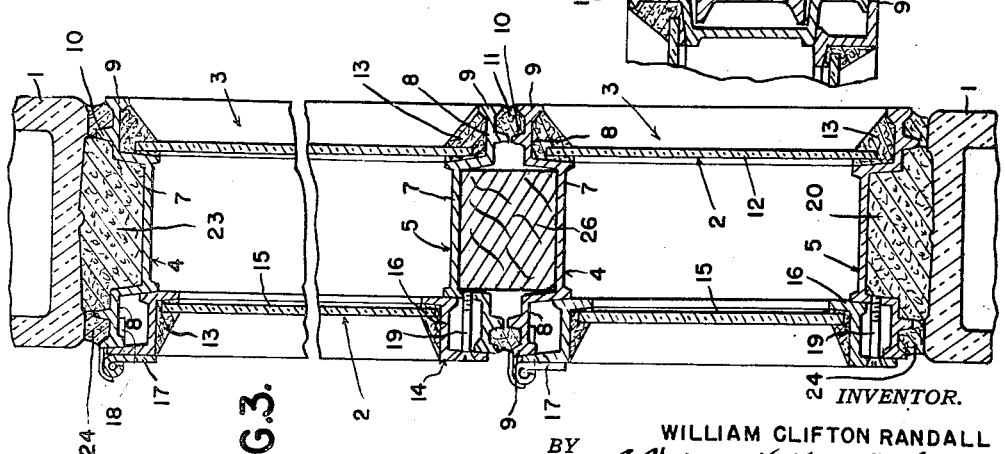
INVENTOR.
WILLIAM CLIFTON RANDALL
BY
*Whittemore Hulbert & Belknap*
ATTORNEYS

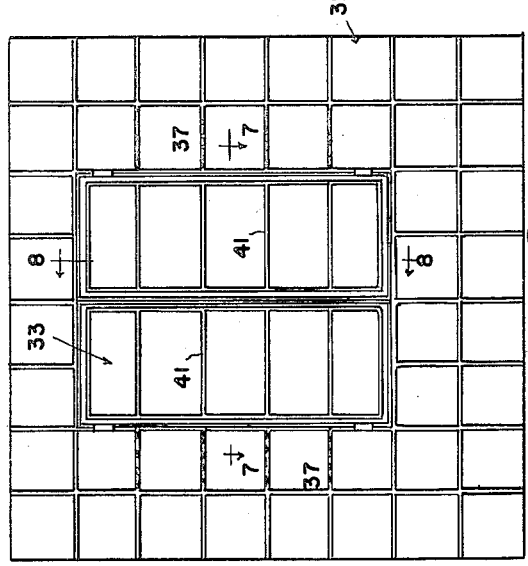
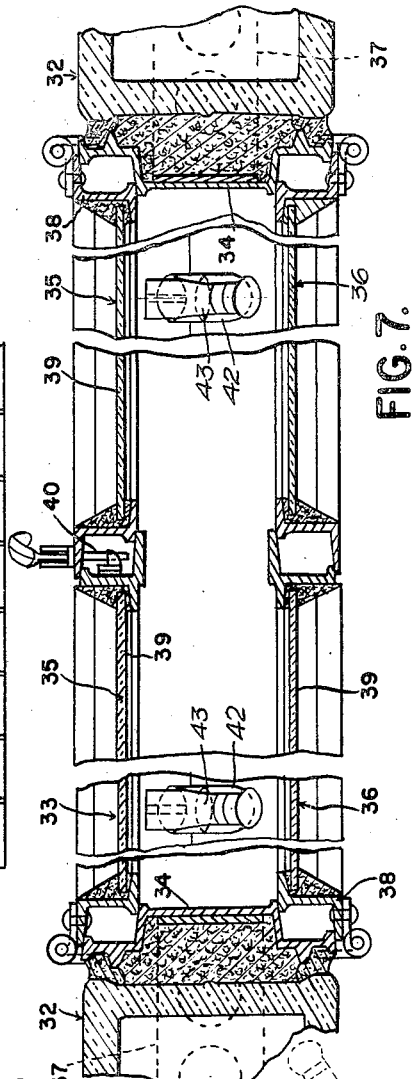
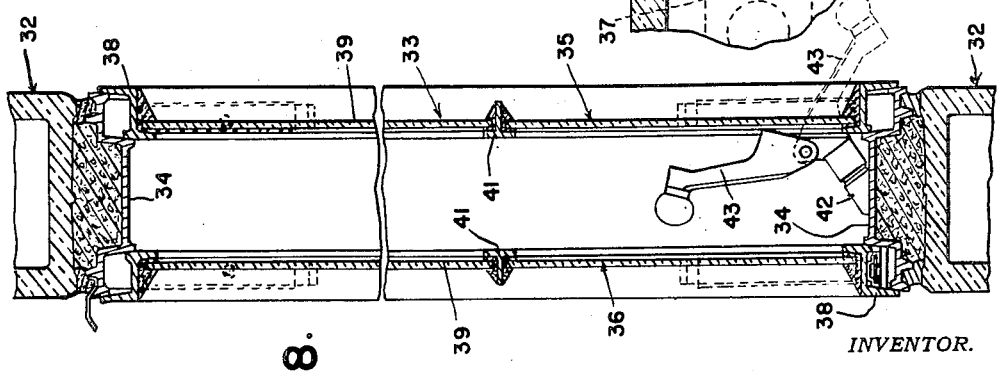

Patented Jan. 16, 1945

2,367,610

UNITED STATES PATENT OFFICE 2,367,610

PANEL FOR USE IN WALLS, PARTITIONS, AND THE LIKE

William Clifton Randall, Birmingham, Mich., assignor to Detroit Steel Products Company, Detroit, Mich., a corporation of Michigan Application December 19, 1941, Serial No. 423,656

3 Claims. (Cl. 189—75)

The invention relates to panels for use in walls, partitions and the like, and refers more particularly to double glazed panels.

The invention has for some of its objects to provide a panel which is so constructed that it may be readily used with a panel formed of another material and especially glass blocks, or substituted for the latter panel; to provide units which can be prefabricated at the factory and which have predetermined transverse face dimensions between center lines in multiples of the transverse face dimensions between center lines of standard individual glass blocks to enable building up of a panel formed of the units for use with a panel formed of the glass blocks; and to so construct the units that they can be assembled on the job by successively laying them in place.

The invention has for other objects to provide a panel having a frame constructed to permit double glazing and to permit the use of a movable sash at either the inside or the outside, or both sides; to provide a panel having uniform appearance and relatively large lights; to provide a panel in which the joints between the units are formed and caulked in a manner to produce much the same appearance as the caulked joints of glass blocks and masonry; and to provide a panel comprising a plurality of units having their joints so formed that they may be reinforced.

These and other objects of the invention will become apparent from the following description, taken in connection with the accompanying drawings, in which Figure 1 is an outside elevation of a wall embodying my invention;

Figures 2 and 3 are enlarged cross sections on the lines 2—2 and 3—3, respectively, of Figure 1;

Figure 6 is an outside elevation of a wall illustrating a modification;

Figure 9:
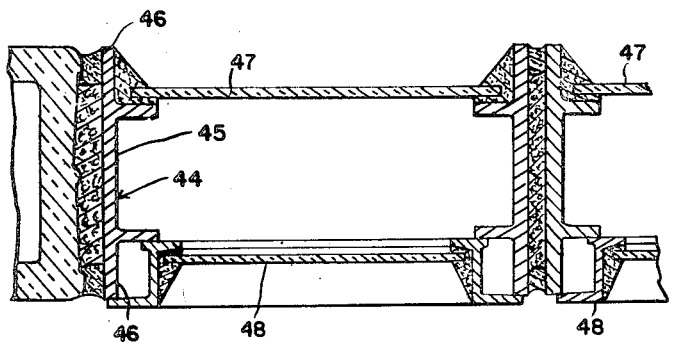

Figures 7 and 8 are enlarged cross sections on the lines 7—7 and 8—8, respectively, of Figure 6;

Figure 9 is a view similar to Figure 2 showing a modification.

Referring to Figures 1, 2 and 3, the wall is formed of the glass block panel 1 and the glazed panel 2. The individual glass blocks forming the panel 1 are of standard construction and laid in mortar in the usual manner. The glass blocks are made in various standard sizes of the same thickness, but different transverse face dimensions, such as 5¾" x 5¾", 7¾" x 7¾", 11¾" x 11¾", so that when the glass blocks are laid in the mortar the transverse face dimensions between center lines are 6" x 6", 8" x 8", 12" x 12". Each of the glazed panels 2 is formed of a plurality of units 3 each of which has transverse or vertical and horizontal face dimensions between center lines in multiples of the transverse face dimensions between center lines of the individual glass blocks forming the panel 1. The minimum transverse face dimensions between center lines of each unit is preferably double the transverse face dimensions between center lines of the individual glass block. As shown, each unit has transverse face dimensions between center lines in multiples of 8" for use particularly with glass blocks having transverse face dimensions between center lines of 8" x 8".

Each unit 3 has a frame and pane members on the frame. The frame comprises the top and bottom bars 4 and 5, respectively, and the side bars 6 with adjacent ends of the bars rigidly secured together. All of these bars have the same cross section and are preferably formed of metal. Each bar in cross section has the channel 7 which opens outwardly and the coplanar inside and outside flanges 8 which extend laterally or transversely in opposite directions from the free edges of the side walls of the channel. The coplanar flanges are preferably provided at their free edges with the enlargements 9 to, in effect, form T-shaped flanges. The coplanar flanges are also preferably provided between their laterally inner and outer edges with the transverse outwardly extending beads 10 which are laterally spaced from the enlargements 9. The enlargements 9 and the beads 10 on one bar of one frame are in substantial registration with and are also adapted to cooperate with the enlargements 9 and the beads 10, respectively, on the adjacent bar of the adjacent frame when the units are assembled to receive the caulking 11 which serves to seal the joint between the units. The arrangement is such that much the same appearance is secured as the caulked joints of the glass blocks forming the panel 1.

The pane members of each unit are laterally spaced and located at the inside and outside of the unit frame. As illustrated, the inside pane member comprises the glass pane 12 which is located in the space formed by the inside flanges 8 of the frame and is secured against the inside side walls of the channels 7 by a suitable material 13, which preferably extends to the enlarged edges of the flanges. The outside pane member comprises the sash 14 and the glass pane 15 mounted on the sash. The frame of the sash is formed by the Z-bars 16 which extend into the space formed by the outside flanges 8. The inner and outer flanges of the Z-bars in the closed position of the sash contact with the outer side walls of the channels 7 and the enlargements 9 of the outside flanges 8. While each sash can be hinged at the top or either side or projected out or projected in, each sash, as illustrated, is top-hinged with one section 17 of each hinge secured to the outer flange of the top bar of the sash and the other hinge section 18 extending through a notch in the enlargement 9 of the adjacent outside flange 8 and secured to this flange. Each sash is adapted to be secured in closed position by suitable means, such as the screw 19, which extends through the outer flange of the bottom bar of the sash and is threaded into the outside side wall of the channel 7 of the adjacent bottom bar 5. The glass panes 12 and 15 may be transparent, translucent, or the like, or material other than glass may be used to form the panes. The principal reason for having the outside pane member movable is to permit cleaning the outside of the inside pane member, as well as the inside of the outside pane member.

The bottom units 3 of each glazed panel are mounted upon and secured to the adjacent portion of the wall by means such as the mortar 20 which extends within the channels of the bottom bars 5 of the frames. The side units of each glazed panel are secured to the adjacent portion of the wall by means such as the mortar 21 which extends within the channels of the side bars 6 of the frames. Suitable flat anchor clips 22 laid in the joints between the frames and also between the glass blocks may also be used. The top units of each glazed panel are secured to the adjacent portion of the wall by means such as the mortar 23 in much the same manner as the bottom units. The outside joints between all of the outer bars and the adjacent portions of the wall may be sealed by the caulking 24 which presents much the same appearance as that between adjacent units. If the glazed panels are relatively small or are made up in relatively small sections, grout or mortar 25 is preferably used between adjacent bars of the units. The wood strips 26 and the metal members 27 may also be used to strengthen or reinforce the glazed panels, especially if relatively large. The wood strips may extend both horizontally and vertically and within the channels 7 and, as illustrated, they extend horizontally. The metal members preferably extend vertically throughout the height of the glazed panel and are preferably anchored at both ends in the glass block panel of the wall. The reinforcing members preferably extend into the channels 7 and the spaces 28 formed by the coplanar flanges 8 laterally inside the beads 10.

The construction is such that the prefabricated units forming the glazed panel may be successively laid in place while building up the wall, or laid in a prepared opening, in which latter case the anchoring clips are preferably omitted. More particularly, the prefabricated units may be laid side by side and one upon the other in courses to form the desired glazed panel.

Figure 4:
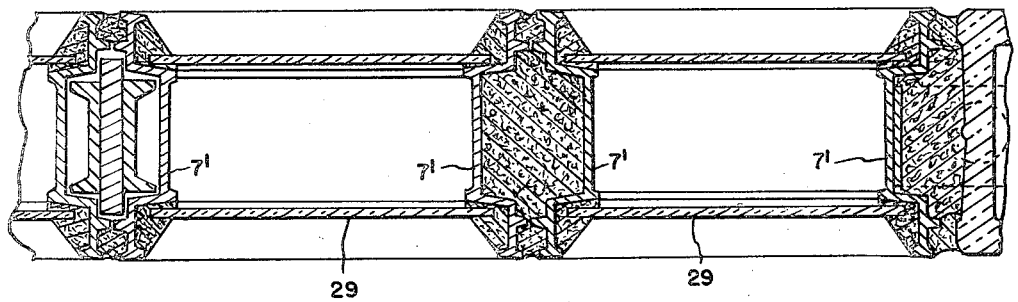
Figure 4 is a view similar to a portion of Figure 2, showing a modification.

In the modification illustrated in Figure 4, the wall is, in general, formed in the same manner as that illustrated in Figures 1 to 3, inclusive. However, instead of the units being built with movable outside pane members, they are built with fixed outside pane members in the nature of panes of glass 29 which are secured against the outer side walls of the channels 7' in the same manner as the panes of glass 12 of Figures 1, 2 and 3.

Figure 5:
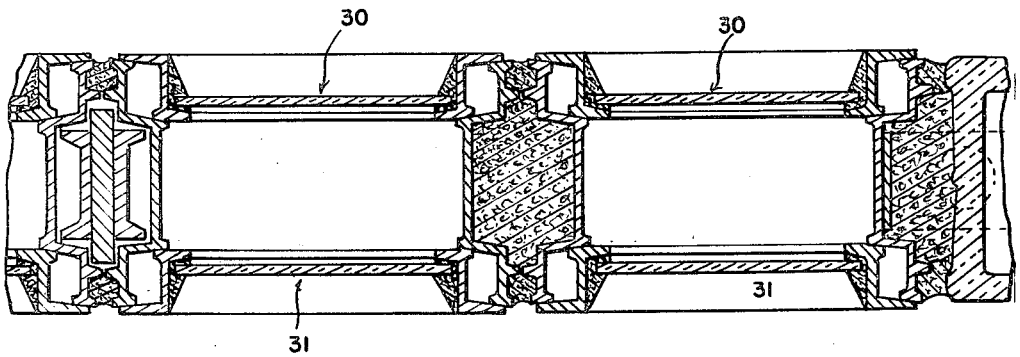
Figure 5 is a view similar to a portion of Figure 2 showing a modification.

As illustrated in Figure 5, the wall is of the same general construction, with the exception that the inside and outside pane members 30 and 31 are both movable to provide primarily for ventilation. In this instance, both pane members are formed in the same manner as the outside pane members of Figures 1, 2 and 3.

Figures 6, 7 and 8 illustrate another type of installation in which the wall is formed of the standard glass block panel 32 and the glazed panel 33. The glazed panel is formed of a single unit which has transverse or vertical and horizontal face dimensions between center lines in multiples of the transverse face dimensions between center lines of the individual glass blocks forming the panel 32, the arrangement being as thus far described the same as that of Figures 1, 2 and 3. The unit has a frame formed of the like metal channel bars 34 and pane members 35 and 36 on the frame at the inside and outside thereof, respectively. Suitable flat metal anchoring clips 37 are preferably used to position the side bars of the frames relative to the adjacent glass block portion of the wall. The joints at the inside and outside between all of the bars of the frame and the adjacent glass block portion of the wall are preferably sealed by caulking presenting much the same appearance as the caulked joints between the glass blocks. The inside and outside pane members are each formed of the pair of sashes 38 and the panes of glass 39. The sashes, as shown, are side-hinged to the side bars of the frame. The adjacent bars of these sashes are adapted to directly overlap in two spaced zones and the adjacent bars of the inside sashes are adapted to be detachably secured together as by means of the locking device 40. In the present instance, each sash 38 is provided with the metal T-shaped cross bars 41 between the panes of glass, these cross bars extending between and being fixedly secured to the side bars of the sash.

Each outside sash is adapted to be swung to open or closed position and secured in closed position by means of the operator 42 which is of standard construction, with the exception that its handle 43 is pivoted so that when it is in inoperative position it is raised to assume the position shown by the full lines in Figure 8, at which time it clears the adjacent inside pane member when in closed position.

Figure 9 illustrates another modification of glazed panel which differs from the previously described structures mainly in the construction of the unit frame 44. The bars of each frame are alike in cross section, each bar having the channel 45 which opens inwardly and the coplanar inside and outside flanges 46 which extend laterally or transversely in opposite directions from the side walls of the channel in the plane of the base of the channel. Suitable material, such as mortar sealed by suitable caulking, is located between the adjacent bars of the unit frames and the outside bars and the adjacent portions of the glass block panel to secure the units to each other and the latter panel. It will be noted that the pane members are secured against the side walls of the channel 45. As shown, the fixed pane member 47 is secured against the adjacent side walls of the channels 45 and the movable sash of the pane member 48 is adapted to contact with the adjacent side walls of the channels 45 and the free edges of the adjacent flanges 46.

What I claim as my invention is:

1. A unit for use in a building panel comprising a frame having an opening and formed of channel bars secured to each other and bordering the opening, each bar having an outwardly opening channel and oppositely extending flanges projecting from the side walls of the channel, enlargements at the free edges of said flanges and transverse beads extending outwardly from said flanges intermediate their edges, the channels being adapted to receive material, the side walls of the channels and said flanges forming spaces for receiving pane members, and said enlargements, beads and the portions of said flanges between said enlargements and beads forming spaces for receiving material.

2. A unit for use in a building panel comprising a frame having an opening and formed of top, bottom and side channel bars secured to each other at their ends and bordering the opening, each bar having an outwardly opening channel and oppositely extending coplanar flanges projecting from the free edges of the side walls of the channel, enlargements at the free edges of said flanges and transverse beads extending outwardly from said flanges intermediate their edges, the channels being adapted to receive material, the side walls of the channels and said flanges forming spaces for receiving pane members, and said enlargements, beads and the portions of said flanges between said enlargements and beads forming spaces for receiving sealing material.

3. A unit for use in a building panel comprising a frame having an opening and formed of bars secured to each other and bordering the opening, each bar having oppositely extending coplanar flanges, enlargements at the free edges of said flanges and transverse beads extending outwardly from said flanges intermediate their edges, said enlargements, beads and the portions of said flanges between said enlargements and beads forming spaces for receiving sealing material.

WILLIAM CLIFTON RANDALL.